United States Patent
Wu et al.

(10) Patent No.: US 11,876,220 B2
(45) Date of Patent: Jan. 16, 2024

(54) SILICON-BASED ANODE MATERIAL FOR SECONDARY BATTERY AND PREPARATION METHOD THEREOF, SECONDARY BATTERY

(71) Applicant: SHANGHAI SHANSHAN TECH CO., LTD., Shanghai (CN)

(72) Inventors: Yuhu Wu, Shanghai (CN); Fei Ma, Shanghai (CN); Dongdong Liu, Shanghai (CN); Liangqin Wei, Shanghai (CN); Zhihong Wu, Shanghai (CN); Xiaoyang Ding, Shanghai (CN); Fengfeng Li, Shanghai (CN)

(73) Assignee: SHANGHAI SHANSHAN TECH CO., LTD., Shanghai (CN)

( * ) Notice: Subject to any disclaimer, the term of this patent is extended or adjusted under 35 U.S.C. 154(b) by 0 days.

(21) Appl. No.: 16/772,780

(22) PCT Filed: Dec. 30, 2019

(86) PCT No.: PCT/CN2019/129890
§ 371 (c)(1),
(2) Date: Jun. 13, 2020

(87) PCT Pub. No.: WO2021/134199
PCT Pub. Date: Jul. 8, 2021

(65) Prior Publication Data
US 2022/0328813 A1    Oct. 13, 2022

(51) Int. Cl.
*H01M 4/38* (2006.01)
*H01M 4/62* (2006.01)
(Continued)

(52) U.S. Cl.
CPC ......... *H01M 4/386* (2013.01); *H01M 4/0471* (2013.01); *H01M 4/366* (2013.01); *H01M 4/625* (2013.01)

(58) Field of Classification Search
None
See application file for complete search history.

(56) References Cited

U.S. PATENT DOCUMENTS

| | | | |
|---|---|---|---|
| 2018/0342757 A1* | 11/2018 | Choi | H01M 4/583 |
| 2020/0161635 A1* | 5/2020 | Liu | H01M 4/366 |

FOREIGN PATENT DOCUMENTS

| | | | |
|---|---|---|---|
| CN | 108963194 A | | 12/2018 |
| CN | 109755500 A | * | 5/2019 |

(Continued)

*Primary Examiner* — Zhongqing Wei

(57) ABSTRACT

A silicon-based anode material for secondary batteries, a preparation method thereof and a secondary battery are provided. The silicon-based anode material includes: an inner core including an Si particle and silicon oxide $SiO_{x1}$, where $0<x1<2$, a first shell layer including a compound of the general formula $M_ySiO_z$ ($0<y\leq 4$, $0<z\leq 5$, and $z\geq x1$) and a C particle, wherein the first shell layer covers the inner core, and the contents of M and C in the first shell layer gradually increase from a side thereof close to the inner core to another side thereof far away from the inner core; and a second shell layer including a carbon film layer or a composite film layer formed by a carbon film layer and a conductive additive, the second shell layer covers the first shell layer. The first charge-discharge cycle capability of the silicon-based anode material is improved, and the manufacturing cost is reduced.

10 Claims, 2 Drawing Sheets

(51) Int. Cl.
*H01M 4/36* (2006.01)
*H01M 4/04* (2006.01)

(56) References Cited

FOREIGN PATENT DOCUMENTS

| | | |
|---|---|---|
| CN | 109755500 A | 5/2019 |
| CN | 110556529 A | 12/2019 |
| WO | 2019/112390 A1 | 6/2019 |

* cited by examiner

US 11,876,220 B2

SILICON-BASED ANODE MATERIAL FOR SECONDARY BATTERY AND PREPARATION METHOD THEREOF, SECONDARY BATTERY

This application is a national stage application of PCT application No. PCT/CN2019/129890, filed on Dec. 30, 2019, and the contents of which is incorporated herein by reference in its entirety.

TECHNICAL FIELD

The present application relates to the field secondary battery materials, in particular to silicon-based anode materials for secondary batteries, preparation methods thereof, and secondary batteries.

BACKGROUND

Conventional lithium ion batteries mainly use graphite as their anode material. However the theoretical capacity of graphite is only 372 mAh/g, which cannot meet the high energy demand for lithium ion batteries in the current industry. There is abundant elemental silicon in nature, and silicon is safe and environmentally friendly. Hence, silicon has attracted high attention from researchers. Moreover, in theory, silicon has a higher capacity, its capacity can reach 4200 mAh/g, its discharge potential is relatively low, its price is low, and it is environmentally friendly. Thus, it can be an excellent anode material for lithium ion batteries. However, due to the serious volume effect of silicon-based materials, the cycle performance of silicon-based materials is very poor, which cannot meet the requirements of commercial applications.

SiOx ($0<x<2$) materials have both high capacity and better cycle performance than elemental silicon, which thus has received extensive attention and research. However, the first charge-discharge efficiency of SiOx ($0<x<2$) materials still has a large gap as compared to graphite, which makes it can hardly meet commercial needs. In the first charge-discharge cycle of graphite, 5% to 20% lithium is used to form a passivation film (solid electrolyte interphase film, or SEI film), and Si and SiOx ($0<x<2$) may consume 20-50% of lithium. Therefore, the lithium supplementation of SiOx ($0<x<2$) anode materials is of great significance to its commercial application.

In the existing technology, a lithium layer is usually directly coated on the surface of the electrode pole piece, or a lithium plating process is employed on the surface of the electrode pole piece to perform lithium supplementation. However, on the one hand, the lithium supplementation process may cause excessive Si grain growth and thus reduce the cycle life of the electrode; on the other hand, the lithium supplementation process has poor safety performance and thus is difficult to achieve the scale of mass production. Moreover, due to the generation of irreversible substances during the lithium intercalation of silicon oxide materials, the first cycle Coulombic efficiency is low, which makes it difficult for its commercial application.

SUMMARY

The present application provides a silicon-based anode material for a secondary battery and a preparation method thereof to improve the first charge-discharge cycle capability of the silicon-based anode material for a secondary battery and reduce the production cost of the silicon-based anode material for a secondary battery.

One aspect of the present application provides a silicon-based anode material fix secondary batteries, comprising: an inner core, wherein the inner core including an Si particle and silicon oxide $SiOx_1$, where $0<x_1<2$; a first shell layer, wherein the first shell layer including a compound of the general formula $M_ySiO_z$ ($0<y≤4$, $0<z≤5$, and $z≥x_1$) and a C particle, the first shell layer covers the inner core, and the contents of M and C in the first shell layer gradually increase from one side thereof close to the inner core to another side thereof far away from the inner core; and a second shell layer, wherein the second shell layer includes a carbon film layer or a composite film layer formed of a carbon film layer and a conductive additive, and the second shell layer covers the first shell layer.

In some embodiments of the present application, M in the first shell layer is any one or more of Li, Na, Mg, Al, Fe and Ca.

In some embodiments of the present application, the mass percentage content of M in the silicon-based anode material is 1-15%, wherein the mass percentage of M is 1-40% of the first shell layer.

In some embodiments of the present application, the mass percentage content of M and C in the first shell layer increases in a gradient manner from the side thereof close to the inner core to the side thereof far away from the inner core.

In some embodiments of the present application, the mass percentage content of M on the side thereof close to the inner core is 0-5% of the first shell layer, and the mass percentage content of M on the side thereof far away from the inner core is 30-48% of the first shell layer.

In some embodiments of the present application, the C particle includes any one or more of hard carbon, soft carbon, and amorphous carbon.

In some embodiments of the present application, the carbon film layer includes any one or more of hard carbon, soft carbon, and amorphous carbon, and the conductive addictive includes carbon nanotube, graphene, conductive carbon black, Ketjen black, vapor-grown carbon fiber, acetylene black, and conductive graphite.

In some embodiments of the present application, in the silicon-based anode material, the mass percentage content of the C particle is 0.1-2%, the mass percentage content of the carbon film layer or the composite film layer formed by the carbon film layer and the conductive additive is 0.1-15%, and the mass percentage content of the conductive additive is 0-5%.

In some embodiments of the present application, a median diameter of the inner core is 1-10 μm, a thickness of the first shell layer is 0.01-2 μm, and a thickness of the second shell layer is 0.01-1 μm.

In some embodiments of the present application, the Si particles in the inner core are uniformly dispersed in the $SiOx_1$.

In some embodiments of the present application, based on the mass of the silicon-based anode material being 100%, a sum of the mass percentage contents of the Si particle, the silicon oxide $SiOx_1$ and the $M_ySiO_z$ is 83-99%.

In another aspect of the present application, a method for preparing a silicon-based anode material for secondary batteries is provided, and the method comprises: preparing a first mixture, wherein the first mixture includes a silicon oxide raw material $SiO_x$ ($0<x<2$), a metal source substance, and a carbon source substance; calcining the first mixture under a non-oxygen condition to obtain a first product, wherein the first product includes: an inner core, wherein the inner core includes an Si particle and silicon oxide $SiOx_1$, where $0<x_1<2$, $x_1>x$; and a first shell layer, wherein the first shell layer covers the inner core, the first shell layer includes a compound of the general formula $M_ySiO_z$ ($0<y\leq4$, $0<z\leq5$, and $z\geq x_1$) and a C particle, the contents of M and C in the first shell layer gradually increase from one side thereof close to the inner core to another side thereof far away from the inner core; and passing the first product through a carbon source substance, or a carbon source substance and a conductive additive to perform a coating reaction, and then performing a carbonization treatment in a non-oxidizing atmosphere, such that a surface of the first shell layer is coated with a second shell layer, wherein the second shell layer includes a carbon film layer or a composite film layer formed by a carbon film layer and a conductive additive.

In some embodiments of the present application, the non-oxidizing atmosphere includes at least one of nitrogen, argon, hydrogen, or helium.

In some embodiments of the present application, a mass ratio of the silicon oxide raw material $SiO_x$ to a metal source substance ranges from 100:1 to 100:50, and a mass ratio of the silicon oxide raw material $SiO_x$ to the carbon source substance ranges from 100:1 to 100:10.

In some embodiments of the present application, a temperature of the non-oxygen condition for calcining is 300-1000° C.; and a temperature of the carbonization treatment is 500-1200° C.

In some embodiments of the present application, the metal source substance includes any one or more of a metal carbonate, a metal nitrate and a metal hydroxide, and the metal includes Li, Na, Mg, Al, Fe and Ca.

In some embodiments of the present application, the metal source substance includes one or more of lithium citrate, lithium carbonate, lithium hydroxide and lithium nitrate.

In some embodiments of the present application, the carbon source substance includes any one or more of citric acid, glucose, resin, coal pitch, petroleum pitch, polyvinyl alcohol, epoxy resin, polyacrylonitrile, polymethyl methacrylate, sucrose, polyacrylic acid and polyvinyl pyrrolidone.

In some embodiments of the present application, the first mixture is a mixture of lithium citrate or lithium carbonate, citric acid and the silicon oxide raw material $SiO_x$ ($0<x<2$).

In some embodiments of the present application, the silicon oxide raw material $SiO_x$ is a powder with a median particle size of 1-10 μm.

In some embodiments of the present application, the percentages of the metal source substance, the carbon source substance and the silicon oxide raw material $SiO_x$ are 0.1-30% and 0.1-9%, respectively.

The present application further provides a secondary battery having an anode including any of the anode materials as described in the embodiments of the present application.

The silicon-based anode material for secondary batteries described in the embodiments of the present application improves the first cycle Coulombic efficiency of the silicon anode after the first shell layer (including $M_ySiO_z$ and the C particle) is formed on the surface of the inner core (including $SiO_{x1}$ and the Si particle). In addition, the second shell layer is coated on the surface of the first shell layer, where the second shell layer can be, for example, a dense carbon film layer, or a carbon film layer and a conductive additive, which improves the cycle performance of the silicon-based anode material. Moreover, the conductive additive can enhance the electron migration rate of the silicon-based anode material and improve the rapid charging ability. The structure of the silicon-based anode material is stable and suitable for mass production.

The preparation method of the silicon-based anode material of secondary batteries in the embodiments of the present application uses metal source substance and carbon source substance to react with $SiO_x$ to generate a first product, certain silicates ($M_ySiO_z$) are also generated during the reaction, thereby improving the first cycle Coulombic efficiency of silicon-based anode material. In addition, a carbon film layer or a composite film layer formed by a carbon film layer and a conductive additive is further coated on the outer layer of the first product, thereby improving the cycle performance of the prepared silicon-based anode material. Moreover, the preparation method of the secondary battery described in the present application is simple in process, low in equipment requirements, and low in cost; and the obtained silicon-based anode material has a stable structure and can be mass-produced.

The secondary battery made of the silicon-based anode material for secondary batteries provided by the embodiments of the present application exhibits high delithiation capacity, high first cycle Coulombic efficiency and good cycle performance; its charging capacity is above 1400 mAh/g, the discharge capacity is above 1627 mAh/g, and the first cycle Coulombic efficiency is above 86%.

Some other features of the present application will be described in the following description. Through the description, the contents in the following drawings and embodiments will become obvious to a person of ordinary skill in the art. The inventive points of the present application will be fully described by practicing or using the methods, means or combinations thereof set forth in the detailed examples discussed below.

BRIEF DESCRIPTION OF THE DRAWINGS

The following figure illustrates in detail the exemplary embodiments disclosed in the present application. The same reference numerals indicate similar structures shown in different figures. A person of ordinary skill in the art will understand that these embodiments are merely exemplary embodiments rather than limiting embodiments. The accompanying drawings are only for the purpose of illustration and description, and are not intended to limit the scope of the present application. Other embodiments may also accomplish the objects of the present application. Moreover, it should be understood that the drawings are not drawn to scale.

DETAILED DESCRIPTION

The following description provides specific application scenarios and requirements of the present application in order to enable a person skilled in the art to make and use the present application. Various modifications to the disclosed embodiments will be apparent to a person skilled in the art. The general principles defined herein may be applied to other embodiments and applications without departing from the spirit and scope of the present application. Therefore, present application is not limited to the embodiments described herein, but the broadest scope consistent with the claims.

The technical solution of the present application will be described in detail below with reference to the embodiments and accompanying drawings.

Figure 1:
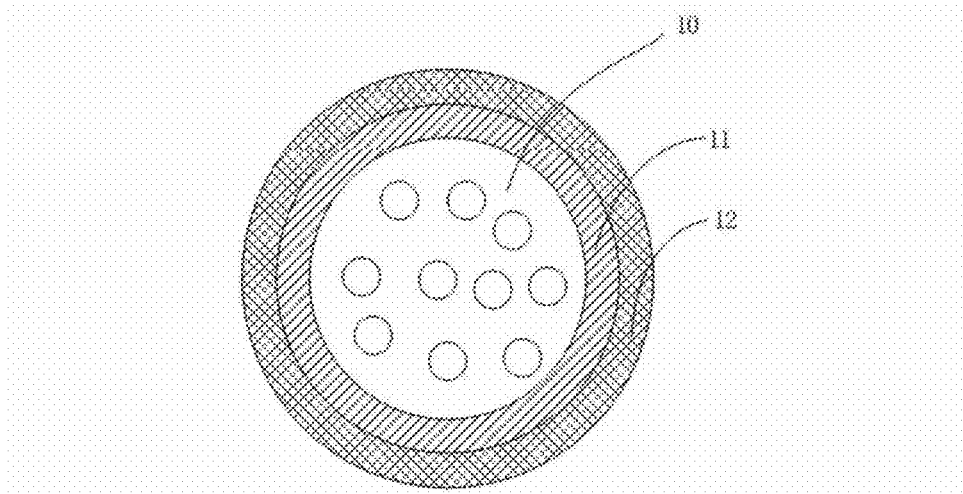
FIG. 1 is a schematic structural diagram of a silicon-based anode material for secondary batteries according to some embodiments of the present application.

An aspect of the present application provides a silicon-based anode material secondary batteries, referring to FIG. 1, including:

an inner core 10, where the inner core 10 includes an Si particle and silicon oxide $SiO_{x1}$, where $0<x1<2$;

a first shell layer 11, where the first shell layer 11 includes a compound of the general formula $M_ySiO_z$ ($0<y\leq4$, $0<z\leq5$, and $z\geq x_1$) and a C particle, the first shell layer 11 covers the inner core 10, the contents of M and C in the first shell layer 11 gradually increase from the side close to the inner core 10 to the side far away from the inner core 10, and the contents of Si and O gradually decrease from the side close to the inner core 10 to the side far away from the inner core 10;

a second shell layer 12, where the second shell layer 12 includes a carbon film layer or a composite film layer formed by a carbon film layer and a conductive additive, and the second shell layer 12 covers the first shell layer 11.

In some embodiments of the present application, the silicon oxide $SiO_{x1}$ ($0<x1<2$) contained in the inner core is a powder, and the Si particle exists in the state of a silicon particle of elemental silicon. The Si particle and the silicon oxide $SiO_{x1}$ exist in the form of a mixture to constitute the inner core of the silicon-based anode material. Moreover, the Si particles are uniformly dispersed in the $SiO_{x1}$, and the "uniformly" herein does not refer to being completely uniformly dispersed, but being substantially uniformly dispersed.

The first shell layer 11 covers the inner core 10, and it may partially cover the inner core 10 or completely cover the inner core 10. By way of most types of the manufacturing processes for silicon-based anode materials, the inner shell 10 can be completely covered by the first shell layer 11. FIG. 1 schematically shows the case of completely coating. However, the first shell layer 11 is not necessarily a perfect circular coating structure, as long as the coating thickness of the first shell layer 11 is generally close to each other at different locations.

In some embodiments of the present application, the first shell layer 11 includes a compound of the general formula $M_ySiO_z$ ($0<y\leq4$, $0<z\leq5$, and $z\geq x_1$) and a C particle, where M may be any one or more of Li, Na, Mg, Al, Fe and Ca, for example, $M_ySiO_z$ is $Li_2SiO_3$, $Li_2Si_2O_5$, $Li_4SiO_4$, $MgSiO_3$, $CaSiO_3$, $FeSiO_3$ or the like.

In some embodiments of the present application, the contents of M and C in the first shell layer 11 gradually increase from a side close to the inner core 10 to a side far away from the inner core 10, and the contents of Si and O gradually decrease from the side close to the inner core to the far away from the inner core 10. The gradual increase herein may be an uneven increase or an even monotonous increase, and the gradual decrease herein may be an uneven decrease or an even monotonous decrease. For example, the content may increase from 3% to 45% in a linear manner, or it may increase from 4% to 30% in a linear manner.

In some other embodiments of the present application, the mass percentage content of the M element in the first shell layer increases from the side close to the inner core to the side away from the inner core in a gradient manner. For example, the mass percentage content of M in the first shell layer is first maintained at a certain level of 3.5% for a certain thickness, then increased to the level of 11.5% for a certain thickness, increased to 19.5% for a certain thickness, increased to 27.5% for a certain thickness, and next increased to 35.5% for a certain thickness.

In some embodiments of the present application, overall the mass percentage content of M on the side close to the inner core accounts for 0-5% of the first shell layer, and the mass percentage content of M on the side far away from the inner core accounts for 30-48% of the first shell layer. Based on the mass of the first shell layer being 100%, the overall average content of M in terms of mass percentage of the first shell layer is 1-40%.

In some embodiments of the present application, the C particle may be any one or more of hard carbon, soft carbon, or amorphous carbon, and the C particle exists in the form of elemental carbon. The role of the C particle is to limit the size of the silicon particle while improving the electrical conductivity of the first shell layer. The C particles in the first shell layer are uniformly dispersed in $M_ySiO_z$.

In the silicon-based anode material (based on the mass of the silicon-based anode material being 100%), the mass percentage content of the M element is 1% to 15%, for example, 2%, 4%, 5%, 8%, 10%, 12%, 14%, etc. The mass percentage content of the C particle is 0.1% ~2%, such as 0.2%, 0.4%, 0.6%, 0.8%, 1%, 1.2%, 1.4%, 1.6%, 1.8%, etc.

In some embodiments of the present application, based on the mass of the silicon-based anode material being 100%, the sum of the mass percentage contents (Wt) of the Si particles, silicon oxide $SiO_{x1}$ and $M_ySiO_z$ is 83% ~99%, for example, 87%, 90%, 92%, 95%, 97%, etc. Among them, the mass percentage content of silicon oxide $SiO_{x1}$ ($Wt_2$) ranges from 55 to 75%, the mass percentage content of $M_ySiO_z$ compound ($Wt_3$) ranges from 1 to 20%, and the mass percentage content of Si particles $Wt_1$ ranges from ($Wt_1=Wt-Wt_2-Wt_3$).

In some embodiments of the present application, the second shell layer 12 covers the first shell layer 11. The second shell layer 12 may include only a carbon film layer, and may also include a composite film layer formed of a carbon film layer and a conductive additive, wherein the conductive additive is uniformly dispersed in the carbon film layer to form the second shell layer. The second shell layer completely covers the first shell layer to prevent the silicon-containing materials (including Si particle, silicon oxide $SiO_{x1}$ and $M_ySiO_z$) in the first shell layer and inner core from directly contacting the electrolyte, slowing down the surface powdering of the silicon-based anode material and prolong the cycle life. The conductive additive is used to increase the conductivity of the silicon-based anode material.

In some embodiments of the present application, in the silicon-based anode material, the mass percentage content of the carbon film layer or the composite film layer formed by the carbon film layer and the conductive additive is 0.1-15%, and the mass percentage content of the conductive additive is 0-5%.

The carbon film layer material includes any one or more of hard carbon, soft carbon, or amorphous carbon, and the conductive additive includes any one or more of carbon nanotubes, graphene, conductive carbon black, Ketjen black, vapor grown carbon fiber, acetylene black, and conductive graphite.

In some embodiments of the present application, the median diameter of the inner core is 1-10 μm, and the thickness of the first shell layer is 0.01-2 μm. The thickness of the second shell layer is 0.01-2 μm.

The silicon-based anode material for secondary batteries described in the embodiments of the present application improves the first coulombic efficiency of the silicon anode after forming the first shell layer ($M_ySiO_z$ and C particle) on the inner core ($SiO_{x1}$ and Si particle) surface; The layer is coated with a second shell layer, the second shell layer is, for example, a dense carbon film layer or a composite film layer of carbon film layer and conductive additive, which improves the cycle performance of the silicon-based anode material, moreover, the conductive additive can enhance the electron migration rate of the silicon-based anode material and improve the rapid charging ability; the structure of the silicon-based anode material is stable and mass production can be achieved.

Further, the contents of M and C in the first shell layer of the silicon-based anode material gradually increases from the side close to the inner core to the side far away from the inner core. This change in material concentration is beneficial to improve the structural stability of the silicon-based anode material and reduce the expansion stress of the second shell layer. Furthermore, when the contents of the M and C increase gradually from the side close to the inner core to the side far away from the inner core, the formed concentration gradient can improve the stability of the silicon-based anode material structure and reduce the expansion stress of the second shell layer.

Another aspect of the present application provides a method for preparing a silicon-based anode material for secondary batteries, including:

Step S1, a first mixture is prepared, where the first mixture includes a silicon oxide raw material $SiO_x$, a metal source substance, and a carbon source substance (where $0<x<2$);

In the above step, the silicon oxide raw material $SiO_x$ is a powder with a median diameter D50 of 1 to 10 μm. The method for forming the silicon oxide raw material $SiO_x$ powder may be, for example, to obtain the $SiO_x$ powder by coarsely crushing and pulverizing a bulk material of $SiO_x$. The coarse crushing step includes using a jaw crusher, a roller crusher, a conical crusher, a hammer crusher or an impact crusher to coarsely crush the bulk material of $SiO_x$. The pulverizing step includes using any one of an air jet crusher, a mechanical crusher, a ball mill, or a vibratory mill to further crush the coarsely crushed $SiO_x$ to obtain a powder with a median particle size of 1-10 μm.

The method fix preparing the first mixture my employs, for example, any one of a high-speed dispersing machine, a high-speed stirring mill, a ball mill, a conical mixer, a spiral mixer, a stirring mixer, or a VC mixer to mix a powder form silicon oxide raw material $SiO_x$ uniformly with the metal source substance and the carbon source substance.

In some embodiments of the present application, the metal source substance may include any one or more of a metal carbonate, a metal nitrate, and a metal hydroxide, where the metal may be Li, Na, Mg, Al, Fe or Ca. For example, the metal source substance may include one or more of lithium citrate, lithium carbonate, lithium hydroxide or lithium nitrate; the carbon source substance may include any one or more of citric acid, glucose, resin, coal pitch, petroleum pitch, polyvinyl alcohol, epoxy resin, polyacrylonitrile, polymethyl methacrylate, sucrose, polyacrylic acid and polyvinyl pyrrolidone.

In some embodiments of the present application, the metal source substance may be lithium citrate or lithium carbonate, the carbon source substance may be citric acid, and the first mixture may be a mixture of lithium citrate or lithium carbonate, citric acid, and $SiO_x$ ($0<x<2$).

In some embodiments of the present application, the mass ratio of the silicon oxide raw material $SiO_x$ to the metal source substance ranges from 100:1 to 100:50, and the mass ratio of the silicon oxide raw material $SiO_x$ to the carbon source substance ranges from 100:1 to 100:10. That is, as the mass of the silicon oxide raw material $SiO_x$ being 100 g, the mass of the metal source substance is 1-50 g, and the mass of the carbon source substance is 1-10 g.

Step S2, calcining the first mixture under non-oxygen conditions to obtain a first product, where the first product includes:

an inner core, wherein the inner core includes an Si particle and silicon oxide $SiOx_1$, where $0<x_1<2$, $x_1>x$; and a first shell layer, wherein the first shell layer covers the inner core, the first shell layer includes a compound of the general formula $M_ySiO_z$ ($0<y\leq 4$, $0<z\leq 5$, and $z\geq x_1>x$) and a C particle, the contents of M and C in the first shell layer gradually increase from one side thereof close to the inner core to another side thereof far away from the inner core; and the contents of Si and O in the first shell layer gradually decrease from one side thereof close to the inner core to another side thereof far away from the inner core.

In some embodiments of the present application, the non-oxidizing atmosphere refers to that the reaction gas includes at least one of nitrogen, argon, hydrogen, or helium. In some embodiments of the present application, the calcining temperature under the non-oxygen conditions may be 300° C. -1000° C., and the calcining time may be 1-24 hours. For example, the calcining temperature is 400° C., 500° C., 600° C., 700° C., 800° C., 900° C., etc. The calcining time is 2 hours, 4 hours, hours, 6 hours, 8 hours, 11 hours, 13 hours, 16 Hours, 18 hours, 21 hours, etc.

The equipment for performing the calcination process may be, for example, any one of a rotary furnace, a roller track kiln, a push plate kiln, an atmosphere box furnace, or a tube furnace. By means of adjusting the content of the first mixture to be reacted, the concentrations of the metal source substance and carbon source substance, as well as the reaction time and temperature of the calcination process, the contents of M and C in the first shell layer gradually increase from the side close to the inner core to the side far away from the inner core, while the contents of Si and O gradually decrease from the side close to the inner core to the side far away from the inner core. That is to say, in the embodiments of the present application, by means of controlling the time, temperature and reaction concentration ratio of the metal source substance M and the inner core substance (Si particle and silicon, oxide $SiO_{x1}$), the generation of $M_ySiO_z$ and the M and C contents in the first shell layer from the side close to the inner core to the side far away from the inner core can be controlled.

Step S3, the first product is coated with carbon source substance or a mixture of a carbon source substance and a conductive additive; next, a carbonization treatment is performed in a non-oxidizing atmosphere, such that the surface of the first shell layer is coated with a second shell layer, where the second shell layer includes a carbon film layer or a composite film layer formed by a carbon film layer and a conductive additive.

In some embodiments of the present application, the equipment that can perform the foregoing coating reaction may be any one of a mechanical fusion machine, a VC mixer, a coating kettle, a spray dryer, a sand mill, or a high-speed disperser. The non-oxidizing atmosphere refers to that the reaction gas includes at least one of nitrogen, argon, hydrogen, or helium.

The carbon source substance includes any one or more of citric acid, glucose, resin, coal pitch, petroleum pitch, polyvinyl alcohol, epoxy resin, polyacrylonitrile, polymethyl methacrylate, sucrose, polyacrylic acid and polyvinyl pyrrolidone. The temperature for the carbonization treatment is 500-1200° C., and the treatment time is 1-12 hours. For example, the temperature for the carbonization treatment is 600° C., 700° C., 800° C., 900° C., 1000° C., 1100° C., etc. The treatment time is 2 hours, 4 hours, hours, 6 hours, 8 hours, 11 hours, etc.

The carbon film layer in this case includes any one or more of hard carbon, soft carbon or amorphous carbon. The conductive additive includes any one or more of carbon nanotube, graphene, conductive carbon black, Ketjen black, vapor-grown carbon fiber, acetylene black, conductive graphite, and the like.

The method for preparing the silicon-based anode material of secondary batteries provided in the embodiments of the present application uses metal source substance and carbon source substance to react with $SiO_x$ so as to generate a first product, silicate ($M_ySiO_z$) is also generated during the reaction, thereby improving the first cycle Coulombic efficiency of the silicon-based anode material. Moreover, by means of coating a carbon film layer or a composite film layer of a carbon film layer and a conductive additive on the outer surface the first product, the cycle performance of the prepared silicon-based anode material can be improved. Furthermore, the preparation method of the secondary battery as described in the present application is simple in process, low in equipment requirements, and low in cost; and the obtained silicon-based anode material has a stable structure and thus can be mass-produced.

The present application further provides a secondary battery having an anode including any of the anode materials described in the embodiments of the present application.

EXAMPLE 1

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with lithium carbonate and citric acid in a high-speed stirring mill to prepare a first mixture including lithium carbonate, citric acid and $SiO_x$. In this case, the mass of the silicon oxide raw material $SiO_x$ is 1 kg, the mass of the lithium carbonate is 476.8 g, and the mass of the citric acid is 5 g.

The first mixture is calcined in a rotary furnace in an argon atmosphere at a calcining temperature of 750° C. and for a reaction time of 12 h to obtain a first product including an inner core, which includes $SiO_{x1}$ and Si particle, and a first shell layer, which includes $Li_2SiO_3$ and a C particle.

The first product is then subjected to a coating reaction with a conductive graphite-doped pitch in a coating kettle. The coaling reaction is carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $Li_2SiO_3$ and the C particle, and a second shell layer, which is a carbon film layer doped with conductive graphite.

The mass percentage content of Li in the silicon-based anode material is 10%, where the mass percentage content of Li in the inner side of the first shell layer is 4%, and the mass percentage content of Li in the outer side of the first shell layer is 45%. The secondary battery made with the foregoing silicon-based anode material has a reversible capacity of 1430 mAh/g, a first cycle Coulombic efficiency of 89%, and a 500-cycles capacity retention rate of 88%.

EXAMPLE 2

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with lithium carbonate and citric acid in a high-speed stirring mill to prepare a first mixture, including lithium carbonate, citric acid and $SiO_x$. In this case, the mass of the silicon oxide raw material $SiO_x$ is 1 kg, the mass of the lithium citrate is 286.1 g, and the mass of the citric acid is 5 g.

The first mixture is calcined in a rotary furnace in an argon atmosphere at a calcining temperature of 750° C. and for a reaction time of 12 h to obtain a first product including an inner core, which includes $SiO_{x1}$ and Si particle, and a first shell layer, which includes $Li_2SiO_3$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $Li_2SiO_3$ and the C particle, and a second shell layer, which is a carbon film layer doped with conductive graphite.

The mass percentage content of Li in the silicon-based anode material is 6%, where the mass percentage content of M in the inner side of the first shell layer is 2.5%, and the mass percentage content of M in the outer side of the first shell layer is 36%. The secondary battery made with the foregoing silicon-based anode material has a reversible capacity of 1500 mAh/g, a first cycle Coulombic efficiency of 85%, and a 500-cycles capacity retention rate of 85%.

EXAMPLE 3

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed, with lithium carbonate and citric acid in a high-speed stirring mill to prepare a first mixture including lithium carbonate, citric acid and $SiO_x$. In this case, the mass of the silicon oxide raw material $SiO_x$ is 1 kg, the mass of the lithium carbonate is 95.4 g, and the mass of the citric acid is 5 g.

The first mixture is calcined in a rotary furnace in an argon atmosphere at a calcining temperature of 750° C. and for a reaction time of 12 h to obtain a first product including an inner core, which includes $SiO_{x1}$ and Si particle, and a first shell layer, which includes $Li_2SiO_3$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $Li_2SiO_3$ and the C particle, and a second shell layer, which is a carbon film layer doped with conductive graphite.

The mass percentage, content of M in the silicon-based anode material is 2%, where the mass percentage content of Li in the inner side of the first shell layer is 0.5%, and the mass percentage content of M in the outer side of the first shell layer is 21%. The secondary battery made with the foregoing silicon-based anode material has a reversible capacity of 1500 mAh/g, a first cycle Coulombic efficiency of 82%, and a 500-cycles capacity retention rate of 78%.

EXAMPLE 4

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with lithium carbonate and citric acid in a high-speed stirring mill to prepare a first mixture including lithium carbonate, citric acid and $SiO_x$. In this case, the mass of the silicon oxide raw material $SiO_x$ is 1 kg, the mass of the lithium carbonate is 476.8 g, and the mass of the citric acid is 5 g.

The first mixture is calcined in a rotary furnace in an argon atmosphere at a calcining temperature of 850° C. and for a reaction time of 12 h to obtain a first product including an inner core, which includes $SiO_{x1}$ and Si particle, and a first shell layer, which includes $Li_2SiO_3$, $Li_2Si_2O_5$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $Li_2SiO_3$, $Li_2Si_2O_5$ and the C particle, and a second shell layer, which is a carbon film layer doped with conductive graphite.

The mass percentage content of Li in the silicon-based anode material is 10%, where the mass percentage content of Li in the inner side of the first shell layer is 4.5%, and the mass percentage content of Li in the outer side of the first shell layer is 44.5%. The secondary battery made with the foregoing silicon-based anode material has a reversible capacity of 1430 mAh/g, a first cycle Coulombic efficiency of 88%, and a 500-cycles capacity retention rate of 90%.

EXAMPLE 5

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with lithium carbonate and citric acid in a high-speed stirring mill to prepare a first mixture including lithium carbonate, citric acid and $SiO_x$. In this case, the mass of the silicon oxide raw material $SiO_x$ is 1 kg, the mass of the lithium carbonate is 476.8 g, and the, mass of the citric acid is 5 g.

The first mixture is calcined in a rotary furnace in an argon atmosphere at a calcining temperature of 950° C. and for a reaction time of 12 h to obtain a first product including an inner core, which includes $SiO_{x1}$ and Si particle, and a first shell layer, which includes $Li_2SiO_3$, $Li_4SiO_4$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $Li_2SiO_3$, $Li_4SiO_4$ and the C particle, and a second shell layer, which is a carbon film layer doped with conductive graphite.

The mass percentage, content of Li in the silicon-based anode material is 10%, where the mass percentage content of Li in the inner side of the first shell layer is 5%, and the mass percentage content of Li in the outer side of the first shell layer is 43%. The secondary battery made with the foregoing silicon-based anode material has a reversible capacity of 1400 mAh/g, a first cycle Coulombic efficiency of 90%, and a 500-cycles capacity retention rate of 86%.

EXAMPLE 6

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with lithium carbonate and citric acid in a high-speed stirring mill to prepare a first mixture including lithium carbonate, citric acid and $SiO_x$. In this case, the mass of the silicon oxide raw material $SiO_x$ is 1 kg, the mass of the lithium carbonate is 476.8 g, and the mass of the citric acid is 5 g.

The first mixture is calcined in a rotary furnace in an argon atmosphere at a calcining temperature of 750° C. and for a reaction time of 8 h to obtain a first product including an inner core, which includes $SiO_{x1}$ and Si particle, and a first shell layer, which includes $Li_2SiO_3$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $Li_2SiO_3$ and the C particle, and a second shell layer, which is a carbon film layer doped with conductive graphite.

The mass percentage content of Li in the silicon-based anode material is 10%, where the mass percentage content of Li in the inner side of the first shell layer is 3%, and the mass percentage content of Li in the outer side of the first shell layer is 46%. The secondary battery made with the foregoing silicon-based anode material has a reversible capacity of 1350 mAh/g, a first cycle Coulombic efficiency of 86%, and a 500-cycles capacity retention rate of 85%.

EXAMPLE 7

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with lithium carbonate and citric acid in a high-speed stirring mill to prepare a first mixture including lithium carbonate, citric acid and $SiO_x$. In this case, the mass of the silicon oxide raw material $SiO_x$ is 1 kg, the mass of the lithium carbonate is 476.8 g, and the mass of the citric acid is 5 g.

The first mixture is calcined in a rotary furnace in an argon atmosphere at a calcining temperature of 750° C. and for a reaction time of 16 h to obtain a first product including an inner core, which includes $SiO_{x1}$ and Si particle, and a first shell layer, which includes $Li_2SiO_3$ and a C particle.

The first product is then subjected to a coating reaction with a conductive graphite-doped pitch in a coating kettle. The coating reaction is carried in an argon atmosphere, the reaction temperature is 600° C., and the reaction time is 10 hours. Finally, a silicon-based anode material is obtained, which includes the inner core including $SiO_{x1}$ and the Si particle, the first shell layer including $Li_2SiO_3$ and the C particle, and a second shell layer, which is a carbon film layer doped with conductive graphite.

The mass percentage content of Li in the silicon-based anode material is 10%, where the mass percentage content of Li in the inner side of the first shell layer is 3%, and the mass percentage content of Li in the outer side of the first shell layer is 46%. The secondary battery made with the foregoing silicon-based anode material has a reversible capacity of 1350 mAh/g, a first cycle Coulombic efficiency of 86%, and a 500-cycles capacity retention rate of 85%.

EXAMPLE 8

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with sodium hydroxide and citric acid in a high-speed stirring mill to prepare a first mixture including sodium hydroxide, citric acid and $SiO_x$. In this case, the mass of the silicon oxide raw material $SiO_x$ is 1 kg, the mass of the sodium hydroxide is 193.2 g, and the mass of the citric acid is 5 g.

The first mixture is calcined in a rotary furnace in an argon atmosphere at a calcining temperature of 750° C. and for a reaction time of 12 h to obtain a first product including an inner core, which includes $SiO_{x1}$ and Si particle, and a first shell layer, which includes $Na_2SiO_3$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a silicon-based anode material obtained, which includes the inner core including $SiO_{x1}$ and the Si particle, the first shell layer including $Na_2SiO_3$ and the C particle, and a second shell layer, which is a carbon film layer doped with conductive graphite.

The mass percentage content of Na in the silicon-based anode material is 10%, where the mass percentage content of Na in the inner side of the first shell layer is 2%, and the mass percentage content of Li in the outer side of the first shell layer is 46%. The secondary battery made with the foregoing silicon-based anode material has a reversible capacity of 1200 mAh/g, a first cycle Coulombic efficiency of 78%, and a 500-cycles capacity retention rate of 83%.

EXAMPLE 9

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with magnesium carbonate and citric acid in a high-speed stirring mill to prepare a first mixture including magnesium carbonate, citric acid and $SiO_x$. In this case, the mass of the silicon oxide raw material $SiO_x$ is 1 kg, the mass of the magnesium carbonate is 466.5 g, and the mass of the citric acid is 5 g.

The first mixture is calcined in a rotary furnace in an argon atmosphere at a calcining temperature of 950° C. and for a reaction time of 12 h to obtain a first product including an inner core, which includes $SiO_{x1}$ and Si particle, and a first shell layer, which includes $MgSiO_3$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a icon-based anode material is obtained, which includes the inner core including $SiO_{x1}$ and the Si particle, the first shell layer including $MgSiO_3$ and the C particle, and a second shell layer, which is a carbon film layer doped with conductive graphite.

The mass percentage content of Mg in the silicon-based anode material is 12%, where the mass percentage content of Mg in the inner side of the first shell layer is 3%, and the mass percentage content of Mg in the outer side of the first shell layer is 46%. The secondary battery made with the foregoing silicon-based anode material has a reversible capacity of 1400 mAh/g, a first cycle Coulombic efficiency of 82%, and a 500-cycles capacity retention rate of 85%.

EXAMPLE 10

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with aluminum hydroxide and citric acid in a high-speed stirring mill to prepare a first mixture including aluminum hydroxide, citric acid and $SiO_x$. In this case, the mass of the silicon oxide raw material $SiO_x$ is 1 kg, the mass of the aluminum hydroxide is 353.1 g, and the mass of the citric acid is 5 g.

The first mixture is calcined in a rotary furnace in an argon atmosphere at a calcining temperature of 1000° C. and for a reaction time of 12 h to obtain a first product including an inner core, which includes $SiO_{x1}$ and Si particle, and a first shell layer, which includes $AlSi_{1.5}O_{4.5}$ and a C particle.

The first product is then subjected to a coating reaction with a conductive graphite-doped pitch in a coating kettle. The coating reaction is carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $AlSi_{1.5}O_{4.5}$ and the C particle, and a second shell layer, which is a carbon film layer doped with conductive graphite.

The mass percentage content of Al in the silicon-based anode material is 10%, where the mass percentage content of Al in the inner side of the first shell layer is 4%, and the mass percentage content of Al in the outer side of the first shell layer is 45%. The secondary battery made with the foregoing silicon-based anode material has a reversible capacity of 1430 mAh/g, a first cycle Coulombic efficiency of 89%, and a 500-cycles capacity retention rate of 88%.

EXAMPLE 11

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with ferric hydroxide and citric acid in a high-speed stirring mill to prepare a first mixture including ferric hydroxide, citric acid and $SiO_x$. In this case, the mass of the silicon oxide raw material $SiO_x$ is 1 kg, the mass of the ferric hydroxide is 297.4 g, and the mass of the citric acid is 5 g.

The first mixture is calcined in a rotary furnace in an argon atmosphere at a calcining temperature of 1000° C. and for a reaction time of 12 h to obtain a first product including an inner core, which includes $SiO_{x1}$ and Si particle, and a first shell layer, which includes $FeSiO_3$ and a C particle.

The first product is then subjected to a coating reaction with a conductive graphite-doped pitch in a coating kettle. The coating reaction is carried in an argon atmosphere, the reaction temperature is 600° C., and the reaction time is 10 hours. Finally, a silicon-based anode material is obtained, which includes the inner core including $SiO_{x1}$ and the Si particle, the first shell layer including $FeSiO_3$ and the C particle, and a second shell layer, which is a carbon film layer doped with conductive graphite.

The mass percentage content of Fe in the silicon-based anode material is 14%, where the mass percentage content of Fe in the inner side of the first shell layer is 3%, and the mass percentage content of Fe in the outer side of the first shell layer is 46%. The secondary battery made with the foregoing silicon-based anode material has a reversible capacity of 1240 mAh/g, a first cycle Coulombic efficiency of 75%, and a 500-cycles capacity retention rate of 65%.

EXAMPLE 12

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with calcium carbonate and citric acid in a high-speed stirring mill to prepare a first mixture including calcium carbonate, citric acid and $SiO_x$. In this case, the mass of the silicon oxide raw material $SiO_x$ is 1 kg, the mass of the calcium carbonate is 277.8 g, and the mass of the citric acid is 5 g.

The first mixture is calcined in a rotary furnace in an argon atmosphere at a calcining temperature of 1000° C. and for a reaction time of 12 h to obtain a first product including an inner core, which includes $SiO_{x1}$ and Si particle, and a first shell layer, which includes $CaSiO_3$ and a C particle.

The first product is then subjected to a coating reaction with a conductive graphite-doped pitch in a coating kettle. The coating reaction carried out in an argon atmosphere, the reaction temperature is 600° C., and the reaction time is 10 hours. Finally, a silicon-based anode material is obtained, which includes the inner core including $SiO_{x1}$ and the Si particle, the first shell layer including $CaSiO_3$ and the C particle, and a second shell layer, which is a carbon film layer doped with conductive graphite.

The mass percentage content of Ca in the silicon-based anode material is 10%, where the mass percentage content of Ca in the inner side of the first shell layer is 2%, and the mass percentage content of Ca in the outer side of the first shell layer is 45%. The secondary battery made with the foregoing silicon-based anode material has a reversible capacity of 1140 mAh/g, a first cycle Coulombic efficiency of 65%, and a 500-cycles capacity retention rate of 62%.

COMPARATIVE EXAMPLE 1

Bulk $SiO_x$ (x=0.9) is coarsely crushed using a roller crusher, and then the coarsely crushed raw material is next pulverized by a jet mill to obtain a $SiO_x$ powder with a particle size D50 of 5 μm, the obtained $SiO_x$ powder is thoroughly mixed with citric acid in a high-speed stirring mill to prepare a first mixture including citric acid and $SiO_x$. In this case, the mass of the silicon oxide raw material $SiO_x$ is 1 kg and the mass of the citric acid is 5 g.

The first mixture is calcined in a rotary furnace in an argon atmosphere at a calcining temperature of 700° C. to obtain a first product including an inner core, which includes $SiO_{x1}$ and Si particle, and a shell of the C particle.

The first product is then subjected to a coating reaction with a conductive graphite-doped pitch in a coating kettle. The coating reaction is carried out in an argon atmosphere, the reaction temperature is 750° C., and the reaction time is 12 hours. Finally, a silicon-based anode material is obtained, which includes an inner core including SiOx1 and the Si particle, and an outer shell layer of a carbon film layer doped with conductive graphite.

The secondary battery made with the foregoing silicon-based anode material has a reversible capacity of 1650 mAh/g, a first cycle Coulombic efficiency of 76%, and a 500-cycles capacity retention rate of 30%.

COMPARATIVE EXAMPLE 2

Bulk $SiO_x$ (x=0.9) is coarsely crushed using a roller crusher, an then the coarsely crushed raw material is next pulverized by a jet mill to obtain a $SiO_x$ powder with a particle size D50 of 5 μm, the obtained $SiO_x$ powder is thoroughly mixed with citric acid in a high-speed stirring mill to prepare a first mixture including citric acid and $SiO_x$. In this case, the mass of the silicon oxide raw material $SiO_x$ is 1 kg and the mass of the citric acid is 10 g.

The first mixture is calcined in a rotary furnace in an argon atmosphere at a calcining temperature of 700° C. to obtain a first product including an inner core, which includes $SiO_{x1}$ and Si particle, and an outer shell of the C particle.

The first product is then subjected to a coating reaction with a conductive graphite-doped pitch in a coating kettle. The coating reaction is carried out in an argon atmosphere, the reaction temperature is 750° C., and the reaction time is 12 hours. Finally, a silicon-based anode material is obtained, which includes an inner core including $SiO_{x1}$ and the Si particle, and an outer shell layer of a carbon film layer doped with conductive graphite.

The secondary battery made with the foregoing silicon-based anode material has a reversible capacity of 1620 mAh/g, a first cycle Coulombic efficiency of 75%, and a 500-cycles capacity retention rate of 32%.

TABLE 1

Examples, comparative examples and results

| Example | M element | Mass percentage content of the M (%) | Silicon oxide raw material:carbon source substance (mass ratio) | Temperature (° C.) | Incubation time (H) | Reversible capacity (mAh/g) | first cycle Coulombic efficiency (%) | 500-cycles capacity retention rate (%) | Content in inner side of first shell layer (%) | Content in outer side of first shell layer (%) |
|---|---|---|---|---|---|---|---|---|---|---|
| Example1 | Li | 10% | 100:5 | 750 | 12 | 1430 | 89 | 88 | 4 | 45 |
| Example2 | Li | 6% | 100:5 | 750 | 12 | 1500 | 85 | 82 | 2.5 | 36 |
| Example3 | Li | 2% | 100:5 | 750 | 12 | 1550 | 82 | 79 | 0.5 | 21 |
| Example4 | Li | 10% | 100:5 | 850 | 12 | 1430 | 88 | 90 | 4.5 | 44.5 |
| Example5 | Li | 10% | 100:5 | 950 | 12 | 1400 | 90 | 86 | 5 | 43 |
| Example6 | Li | 10% | 100:5 | 750 | 8 | 1350 | 86 | 85 | 3 | 46 |
| Example7 | Li | 10% | 100:5 | 750 | 16 | 1450 | 88 | 89 | 5 | 44 |

TABLE 1-continued

Examples, comparative examples and results

| Example | M element | Mass percentage content of the M (%) | Silicon oxide raw material:carbon source substance (mass ratio) | Temperature (° C.) | Incubation time (H) | Reversible capacity (mAh/g) | first cycle Coulombic efficiency (%) | 500-cycles capacity retention rate (%) | Content in inner side of first shell layer (%) | Content in outer side of first shell layer (%) |
|---|---|---|---|---|---|---|---|---|---|---|
| Example8 | Na | 10% | 100:5 | 850 | 12 | 1200 | 78 | 83 | 2 | 46 |
| Example9 | Mg | 12% | 100:5 | 950 | 12 | 1400 | 82 | 85 | 3 | 46 |
| Example10 | Al | 11% | 100:5 | 1000 | 12 | 1300 | 76 | 69 | 2.2 | 45 |
| Example11 | Fe | 14% | 100:5 | 950 | 12 | 1240 | 75 | 65 | 3 | 46 |
| Example12 | Ca | 10% | 100:5 | 1000 | 12 | 1140 | 65 | 62 | 2 | 45 |
| Comparative example 1 | \ | \ | 100:5 | 750 | 12 | 1650 | 76 | 30 | \ | \ |
| Comparative example 2 | \ | \ | 100:10 | 750 | 12 | 1620 | 75 | 32 | \ | \ |

As shown in Table 1, the secondary battery made of the secondary battery anode material provided by the embodiments of the present application exhibits high delithiation capacity, high first cycle Coulombic efficiency and good cycle performance. In addition, the charging capacity is above 1400 mAh/g, the discharge capacity is above 1627 mAh/g, and the first cycle Coulombic efficiency is above 86%.

Figure 2:
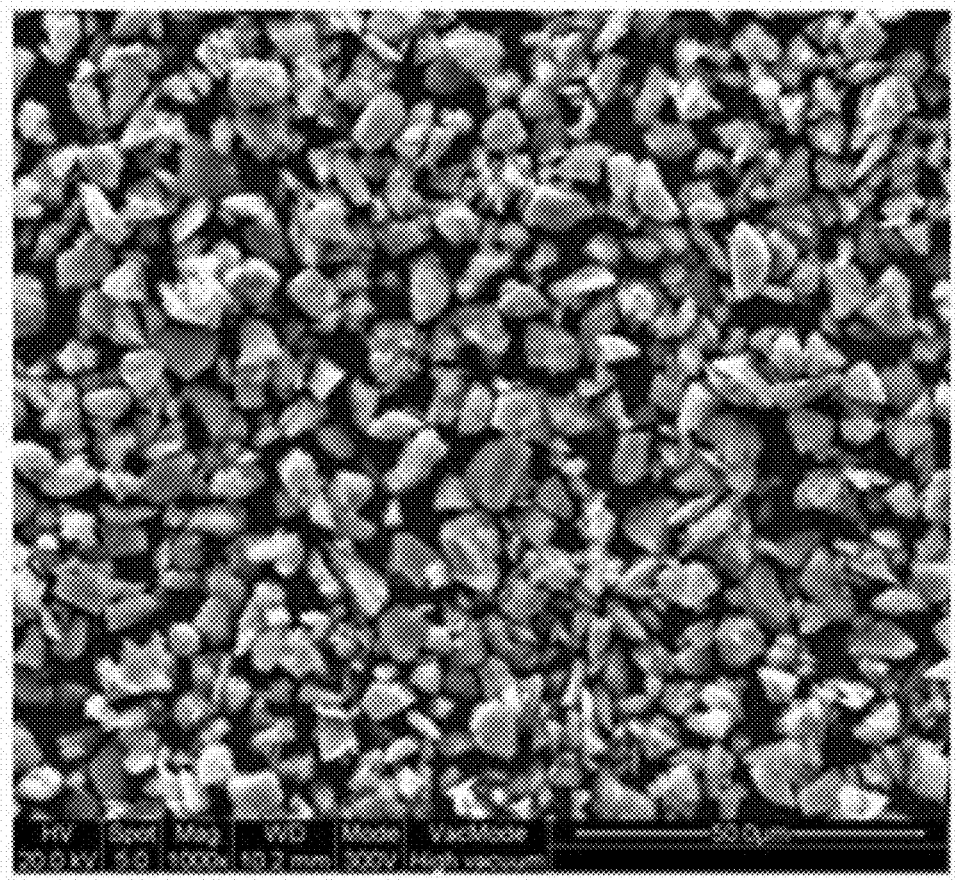
FIG. 2 is an SEM image of a silicon-based anode material according to some embodiments of the present application.

Referring to FIG. 2, which is an SEM image of the silicon-based anode material provided in the embodiments of the present application, it can be seen that the particles of the silicon-based anode material are evenly dispersed.

Figure 3:
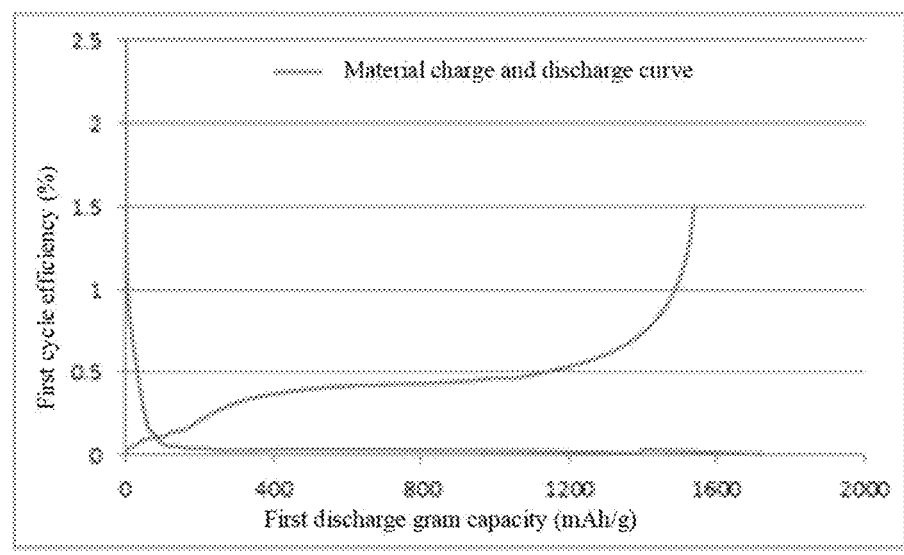
FIG. 3 is a charge-discharge curve when the silicon-based anode material described in the embodiments of the present application is used.

Referring to FIG. 3, which is the charge-discharge curve of the silicon-based anode material provided in the embodiments of the present application, it can be seen that the silicon-based anode material has a high reversible capacity and high first cycle Coulombic efficiency.

In summary, after reading the detailed disclosure provided above, a person skilled in the art will understand that the disclosures are merely some example, and do not limit the present application. Moreover, although not explicitly stated herein, a skilled in the art will understand that the present invention is intended to cover various changes, modifications and improvements of the embodiments. These changes, modifications and improvements are intended to be proposed in the present application and are within the spirit and scope of the exemplary embodiments of the present application.

It will be appreciated by a person of ordinary skill in the art that the term "and/or" used herein includes any and all combinations of one or more of the related items listed.

It will also be appreciated by a person of ordinary skill in the art that the terms "comprise", "comprising", "include" and/or including, when used herein, refer to the presence of stated features, entities, steps, operations, elements and/or assemblies, but do not exclude the presence or addition of one or more other features, entities, steps, operation elements, assemblies and/or combinations thereof.

It should also be understood that although the terms "first", "second", "third", etc. may be used herein to describe various elements, these elements may not be limited by these terms. These terms are merely used to distinguish one element from another. Thus, a first element in some embodiments may be referred to as a second element in other embodiments without departing from the teachings of the present application. Moreover, the same reference symbols or reference numerals are used throughout entire disclosure to represent the same elements.

Furthermore, the exemplary embodiments are described by referring to the cross sectional and/or planar illustrations as the idealized exemplary illustration.

What is claimed is:

1. A silicon-based anode material for secondary batteries, comprising:
an inner core including Si particles and silicon oxide $SiOx_1$, where $0<x_1<2$ and the Si particles are substantially uniformly dispersed in the $SiO_{x1}$;
a first shell layer, wherein the first shell layer includes a compound of a general formula of $M_ySiO_z$ and elemental carbon particles, where $0<y≤4$, $0<z≤5$, and $z≥x_1$, and wherein M includes at least one of Li, Na, Mg, Al, Fe, or Ca, the first shell layer covers the inner core; and
a second shell layer, wherein the second shell layer includes a carbon film layer or a composite film layer formed of a carbon film layer and a conductive additive, and the second shell layer covers the first shell layer,
wherein the content of M in the first shell layer increases from a first side of the first shell layer close to the inner core to a second side of the first shell layer far away from the inner core, and
the content of the elemental carbon particles in the first shell layer is substantially uniformly dispersed in the $M_ySiO_z$ to limit sizes of Si particles, improve stability of the silicon-based anode material, and reduce expansion stress of the second shell layer.

2. The silicon-based anode material for secondary batteries according to claim 1, wherein the mass percentage of M in the silicon-based anode material is 1-15%, and wherein the mass percentage of M is 1-40% of the first shell layer.

3. The silicon-based anode material for secondary batteries according to claim 1, wherein the mass percentage of M in the first shell layer increases in a manner that the mass percentage of M is first maintained at a level for a preset thickness, then increased and maintained to another level for another preset thickness in a gradient manner from the first side of the first shell layer to the second side of the first shell layer.

4. The silicon-based anode material for secondary batteries according to claim 3, wherein the mass percentage of M on the first side of the first shell layer is 0-5% of the first shell layer, and the mass percentage of M on the second side of the first shell layer is 30-48% of the first shell layer.

5. The silicon-based anode material for secondary batteries according to claim 1, wherein the elemental carbon includes at least one of hard carbon, soft carbon, or amorphous carbon.

6. The silicon-based anode material for secondary batteries according to claim 1, wherein the carbon film layer includes at least one of hard carbon, soft carbon, or amorphous carbon, and the conductive additive includes at least one of carbon nanotube, graphene, conductive carbon black, vapor-grown carbon fiber, or conductive graphite.

7. The silicon-based anode material for secondary batteries according to claim 1, wherein in the silicon-based anode material, the mass percentage of the elemental carbon is 0.1-2%, the mass percentage of the carbon film layer or the composite film layer formed by the carbon film layer and the conductive additive is 0.1-15%, and the mass percentage of the conductive additive is 0-5%.

8. The silicon-based anode material for secondary batteries according to claim 1, wherein a median diameter of the inner core is 1-10 μm, a thickness of the first shell layer is 0.01-2 μm, and a thickness of the second shell layer is 0.01-1 μm.

9. The silicon-based anode material for secondary batteries according to claim 1, wherein based on the mass of the silicon-based anode material being 100%, a sum of the mass percentages of the Si particles, the silicon oxide $SiOx_1$ and the $M_ySiO_z$ is 83-99%.

10. A secondary battery, comprising:
a silicon-based anode material including:
an inner core including Si particles and silicon oxide $SiOx_1$, where $0<x_1<2$ and the Si particles are substantially uniformly dispersed in the $SiO_{x1}$,
a first shell layer, wherein the first shell layer includes a compound of the general formula of $M_ySiO_z$, and an elemental carbon particles, where $0<y\leq 4$, $0<z\leq 5$, and wherein M includes at least one of Li, Na, Mg, Al, Fe, or Ca, the first shell layer covers the inner core, and
a second shell layer, wherein the second shell layer includes a carbon film layer or a composite film layer formed of a carbon film layer and a conductive additive, and the second shell layer covers the first shell layer,
wherein the content of M in the first shell layer increases from a first side of the first shell layer close to the inner core to a second side of the first shell layer far away from the inner core, and
the content of the elemental carbon particles in the first shell layer is substantially uniformly dispersed in the $M_ySiO_z$ limit sizes of Si particles, improve stability of the silicon-based anode material, and reduce expansion stress of the second shell layer.

* * * * *